United States Patent
Lennen (10) Patent No.: US 9,176,232 B2
(45) Date of Patent: Nov. 3, 2015

(54) METHOD AND APPARATUS FOR MANAGING AND CONFIGURING TRACKER COMPONENTS FOR ENHANCED SENSITIVITY TRACKING OF GNSS SIGNALS

(75) Inventor: Gary Lennen, Cupertino, CA (US)

(73) Assignee: CSR TECHNOLOGY INC., Sunnyvale, CA (US)

( * ) Notice: Subject to any disclaimer, the term of this patent is extended or adjusted under 35 U.S.C. 154(b) by 886 days.

(21) Appl. No.: 13/341,852

(22) Filed: Dec. 30, 2011

(65) Prior Publication Data

US 2013/0169476 A1  Jul. 4, 2013

(51) Int. Cl.
*G01S 19/24* (2010.01)
*G01S 19/37* (2010.01)
*G01S 19/21* (2010.01)

(52) U.S. Cl.
CPC .............. *G01S 19/246* (2013.01); *G01S 19/37* (2013.01); *G01S 19/21* (2013.01)

(58) Field of Classification Search
USPC .............. 342/357.25, 357.4, 357.46, 357.65; 701/468, 469, 513
See application file for complete search history.

(56) References Cited

U.S. PATENT DOCUMENTS 5,521,941 A * 5/1996 Wiatrowski et al. .......... 375/287
7,301,379 B1 * 11/2007 Burlingame et al. ......... 327/158
7,924,220 B1    4/2011 Lennen

FOREIGN PATENT DOCUMENTS

JP    7-128431    5/1995
JP    8-062318    3/1996

OTHER PUBLICATIONS

Search Report issued May 28, 2013 in corresponding British matter.

* cited by examiner

*Primary Examiner* — Dao Phan (57) ABSTRACT

The present invention is related to location positioning systems, and more particularly, to a method and apparatus for making accuracy improvements to a GPS receiver's navigation calculations. According to a first aspect, the invention provides an extreme sensitivity GNSS tracking architecture. According to other aspects, the architecture includes multiple loops per channel, with the loops implemented with hardware and/or software. According to still further aspects, the architecture includes a multi-level lock detection algorithm designed to provide a trade-off between sensitivity and speed that is not possible with existing tracking architectures.

20 Claims, 6 Drawing Sheets

METHOD AND APPARATUS FOR MANAGING AND CONFIGURING TRACKER COMPONENTS FOR ENHANCED SENSITIVITY TRACKING OF GNSS SIGNALS

FIELD OF THE INVENTION

The present invention is related to location positioning systems, and more particularly, to a method and apparatus for managing and configuring tracking components for enhanced sensitivity tracking of GNSS signals.

BACKGROUND OF THE INVENTION

With the development of radio and space technologies, several satellites based navigation systems (i.e. satellite positioning system or "SPS") have already been built and more will be in use in the near future. Those systems with full global coverage are sometimes referred to as Global Navigation Satellite Systems ("GNSS"). SPS receivers, such as, for example, receivers using the Global Positioning System ("GPS"), also known as NAVSTAR, have become commonplace. Other examples of SPS and/or GNSS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS"), any future Western European SPS such as the proposed "Galileo" program, or any other existing or future system such as the Chinese "Beidou" or "Compass" system. As an example, the U.S. NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

In environments where satellite signals are degraded, however, a GPS receiver often encounters problems in locking onto the signals that are needed for the calculation of position, velocity, altitude, and time. In a degraded signal environment, satellite signals can be weak or otherwise difficult for GPS receivers to lock on to. One example of a degraded signal environment is a tunnel through which a car equipped with a GPS receiver is driving. While the GPS receiver is in the tunnel, the satellite signals are completely obstructed and no lock can be acquired. As a result, the GPS receiver cannot accurately calculate its position and other navigational data (such as velocity, altitude, and time) while the car is in the tunnel. In addition, because GPS receivers typically utilize positioning algorithms that use navigational filters that account for the GPS receivers' last-known positions, the GPS receiver's position calculation when the car emerges from the tunnel can also be less accurate since accurate position calculations were not performed during the time that the car was in the tunnel.

Degraded signal environments are often encountered in urban areas, such as cities with many tall buildings. A city with many tall buildings can contain "urban canyons", which are environments where streets cut through dense blocks of structures such as skyscrapers. In urban canyons, satellite signals are frequently not visible or are degraded due to the signals being partially or fully blocked by buildings, for example. Consequently, the problem of inaccurate position calculations by GPS receivers in degraded signal environments is especially acute in urban areas. Other degraded environments include tunnels, garages, and inside buildings.

Existing techniques such as data aiding have succeeded in improving tracking performance in weak signal environments from 30 dB-Hz down to about 10 dB-Hz. However, further improvements in sensitivity are needed, as well as a need to provide a robust architecture that can handle various signal environments and user dynamics.

SUMMARY OF THE INVENTION

The present invention is related to location positioning systems, and more particularly, to a method and apparatus for making accuracy improvements to a GPS receiver's navigation calculations. According to a first aspect, the invention provides an extreme sensitivity GNSS tracking architecture. According to other aspects, the architecture includes multiple loops per channel, with the loops implemented with hardware and/or software. According to still further aspects, the architecture includes a multi-level lock detection algorithm designed to provide a trade-off between sensitivity and speed that is not possible with existing tracking architectures.

In furtherance of these and other aspects, a GNSS tracker apparatus according to embodiments of the invention includes a fast lock detection that calculates a plurality of fast lock detect values for a corresponding plurality of first signal levels; a slow lock detection that calculates a plurality of slow lock detect values for the corresponding plurality of second signal levels; and a threshold detector that compares the calculated fast and slow lock values to associated thresholds.

In additional furtherance of these and other aspects, a GNSS tracker apparatus according to embodiments of the invention includes a first tracking loop for a signal being tracked, the first tracking loop using a first bandwidth; and a second tracking loop for the same signal being tracked, the second tracking loop using a second bandwidth different than the first bandwidth.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
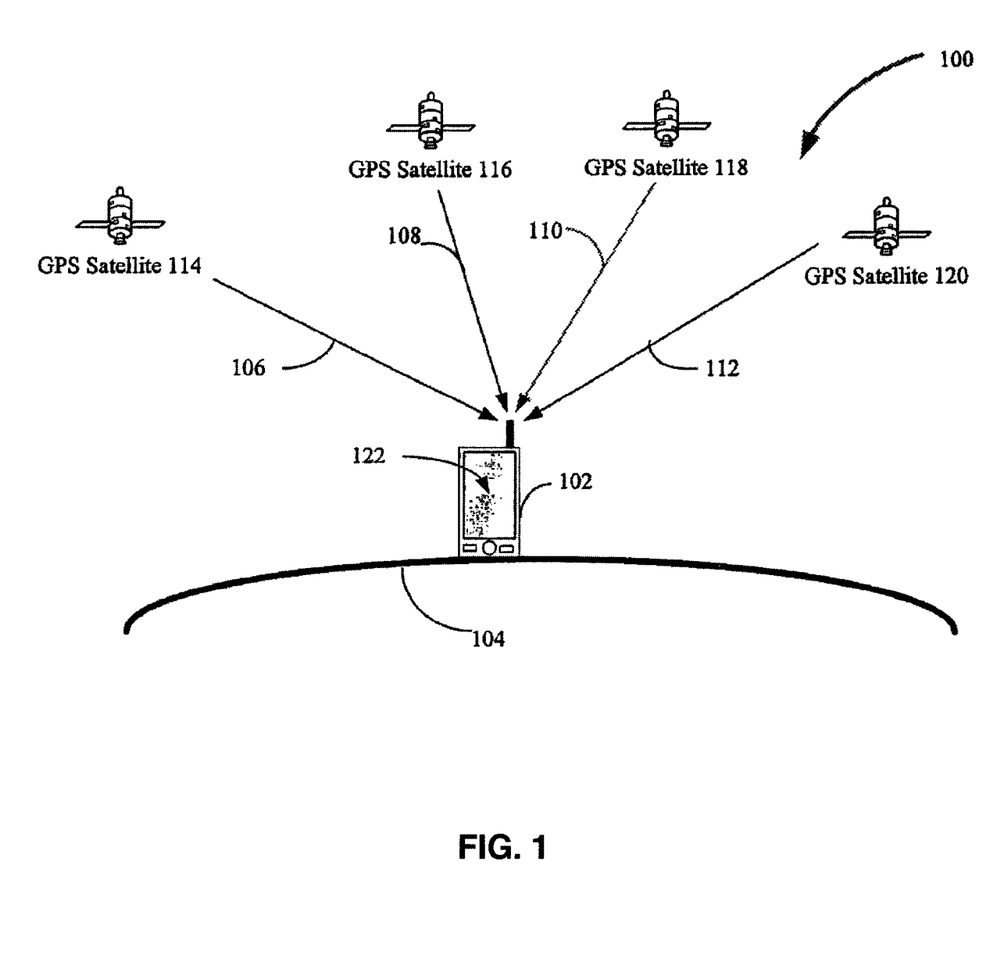
FIG. 1 is a block diagram of an example implementation of principles of the invention.

FIG. 1 illustrates an example implementation of embodiments of the invention. As shown in FIG. 1, GNSS system 100 includes GPS satellites (i.e. SVs) 114, 116, 118 and 120 that broadcast signals 106, 108, 110 and 112, respectively, that are received by receiver 122 in handset 102, which is located at a user position somewhere relatively near the surface 104 of earth.

Handset 102 can be a personal navigation device (PND, e.g. from Garmin, TomTom, etc.) or it can be a cellular or other type of telephone with built-in GPS functionality (e.g. iPhone, Blackberry, Android smartphone, etc.), or any GPS device embedded in tracking applications (e.g. automotive tracking from Trimble, package or fleet management tracking from FedEx, child locator tracking applications etc).

Receiver 122 can be implemented using any combination of hardware and/or software, including GPS chipsets such as SiRFstarIII GSD3tw, SiRFstar IV, SiRFstar V or SiRFstar GSC3e from SiRF Technology and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets and/or software with the tracking loop improvement techniques of the present invention after being taught by the present specification.

The present inventors recognize that the need for accurate location assistance during situations (e.g. city driving, indoors) where signal levels are very weak (e.g. as low as −165 dBm) is an especially acute need. In general, the invention provides a GNSS tracking architecture that is suitable for performance in challenging signal conditions and user dynamics. According to other aspects, the architecture includes multiple loops per channel, with the loops implemented with hardware and/or software. According to still further aspects, the architecture includes a multi-level lock detection algorithm designed to provide a trade-off between sensitivity and speed that is not possible with existing tracking architectures.

Figure 2:
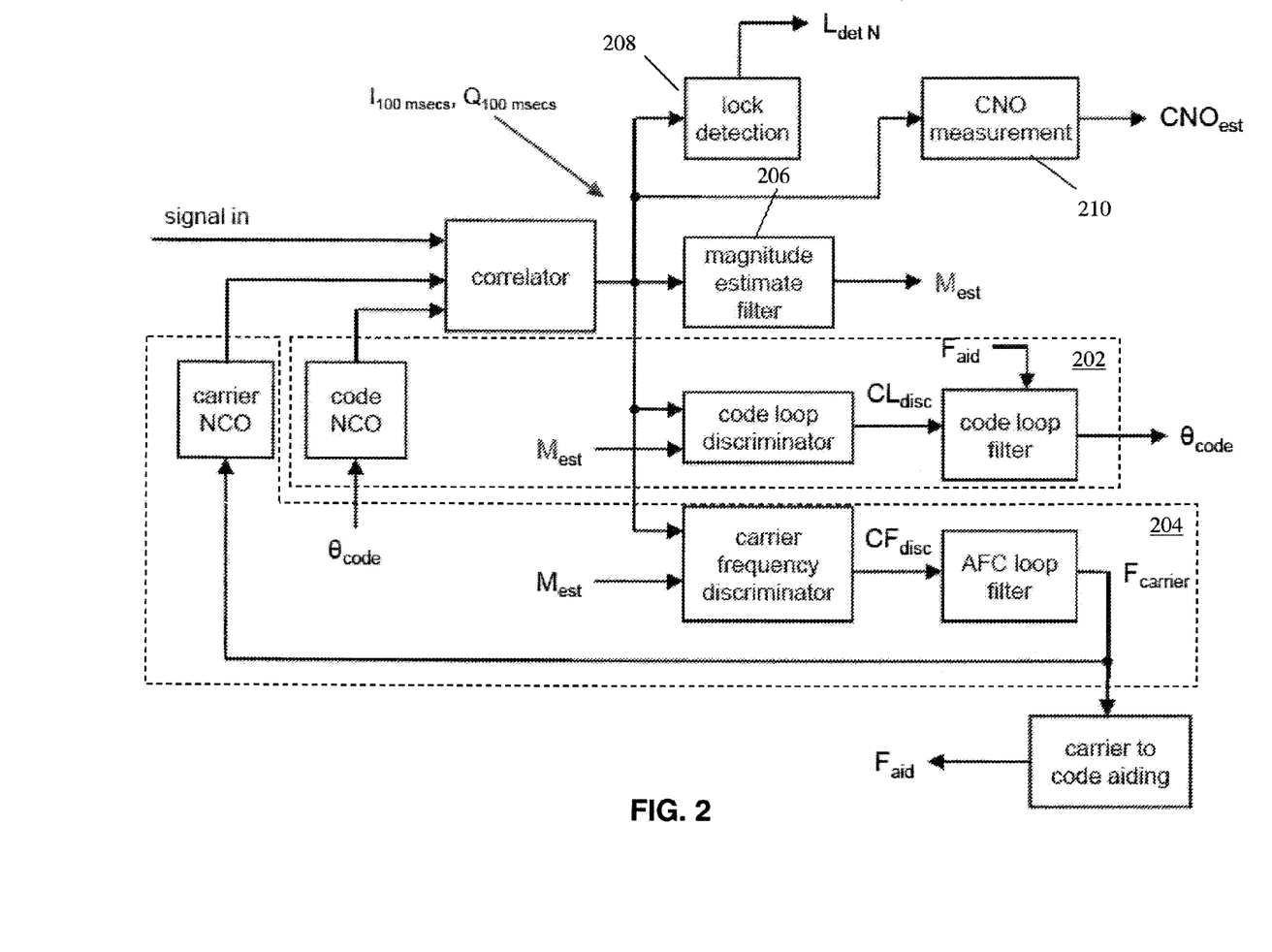
FIG. 2 is a block diagram illustrating an example embodiment of an enhanced sensitivity tracking architecture in accordance with aspects of the invention.

FIG. 2 shows an overview of an example −165 dBm capable tracking architecture in accordance with embodiments of the invention. As shown in FIG. 2, it includes first order code tracking loop 202 and a second order carrier AFC tracking loop 204.

Each loop contains a discriminator (code phase 208, carrier frequency 212) that is gain normalized and/or bandwidth-adjusted using a signal magnitude estimate ($M_{est}$). In embodiments, the loop discriminators and magnitude estimate use 100 msec coherent integrations as their inputs (I100 msecs, Q100 msecs).

The output of the code tracking loop 202 ($\theta_{code}$) provides the feedback to drive the code NCO, situated before the correlation operation. The output of the carrier AFC loop ($F_{carrier}$) provides the feedback to drive the carrier NCO, also situated before the correlation operation. An alternative software feedback code/carrier NCO is also possible.

In embodiments, the code tracking loop 202 is first order and is frequency aided from the carrier AFC loop, via the carrier to code aiding block 216. In these and other embodiments, carrier AFC loop 204 is second order. Many alternatives are possible.

The magnitude estimate is formed in block 206 from the on-frequency (0 Hz carrier offset) I and Q punctual correlators.

Example variable-bandwidth embodiments of code tracking loop 202, carrier tracking loop 204, magnitude estimate filter 206 and carrier to code aiding block 216 are described in more detail in co-pending U.S. application Ser. No. 13/341,851, the contents of which are incorporated herein by reference. Alternative software embodiments of feedback code/carrier loops 202/204, as well as configurations with multiple tracking loops per channel, are also presented in more detail below.

As shown in FIG. 2, according to aspects of the present invention, multi-level lock detects ($L_{detN}$) are formed by lock detect block 208 via the $I_{100\ msecs}$, $Q_{100\ msecs}$ correlators. N indicates a lock detect sensitive to a particular CNO. According to further aspects, CNO measurement block 210 forms a CNO estimate using the $I_{100\ msecs}$, $Q_{100\ msecs}$ correlators as described in more detail below. This estimate provides improved sensitivity over previous designs, as will be described in more detail below.

The following describes example embodiments of multi-level lock detect mechanism 208. In general, lock detect determines if the signal level is higher than a given CNO with a sufficiently high resulting probability of lock detection ($P_d$, when signal is present) and sufficiently low probability of false alarm ($P_{fa}$, when signal is absent). The multi-level lock detect according to the invention can be used for many purposes including the following:

To determine whether a measurement from a track can be used in navigation (the fast lock detects are designed for this purpose).

To determine whether to kill a track or not (the slow lock detects are designed for this purpose).

To switch a filter period (e.g. a K value) within the CNO calculation so as to speed up CNO measurement response.

Figure 6:
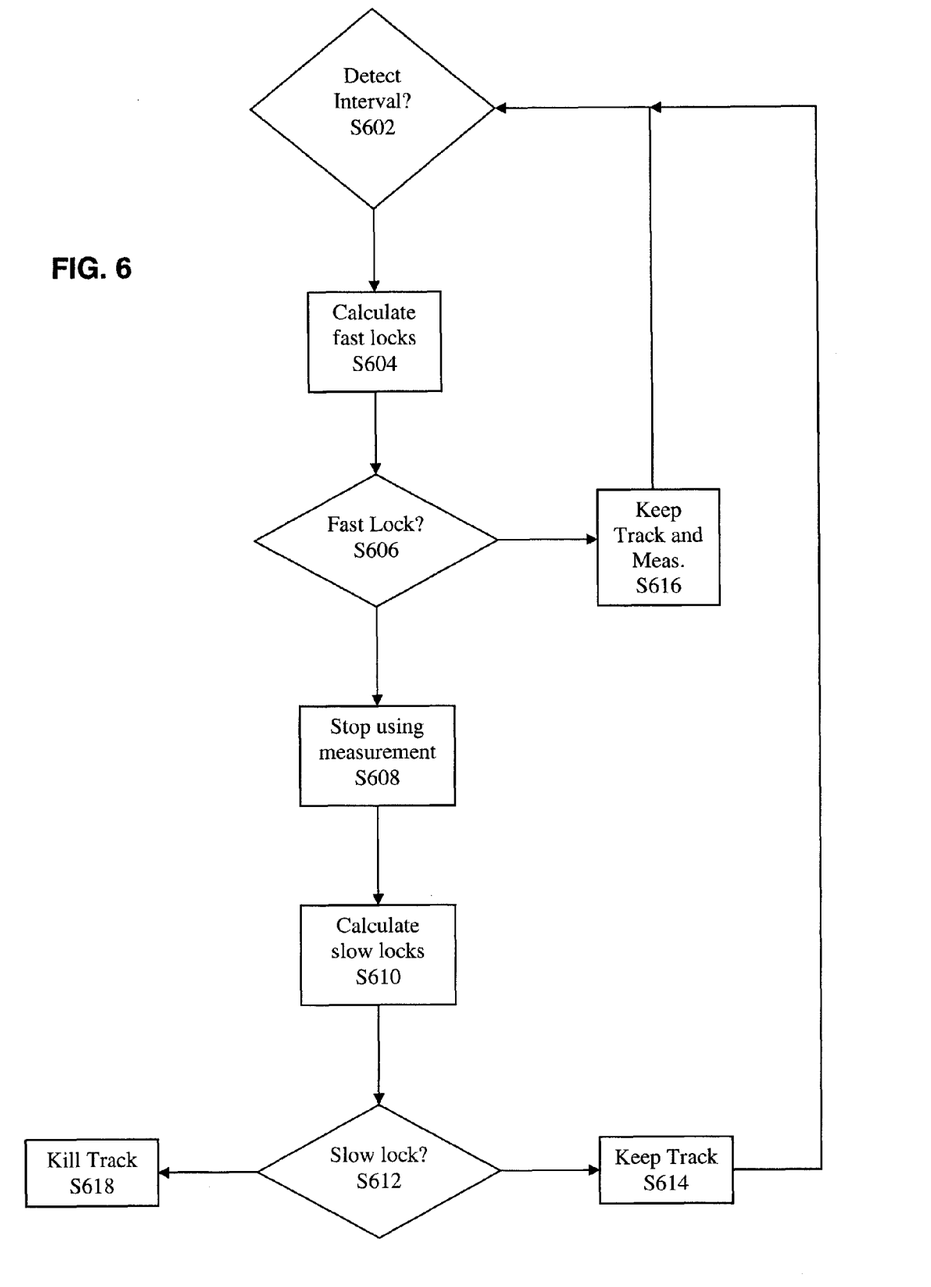
FIG. 6 is a flowchart illustrating an example multi-level lock detect method according to embodiments of the invention.

FIG. 6 is a flowchart illustrating one example method of performing and using a multi-level lock detect according to embodiments of the invention.

Every detection interval (step S602), the lock detect for each track is performed. In embodiments, detection intervals are 100 msec, the same as the coherent integration period, but other detection periods are possible e.g. every 1 second. The interval of 100 msecs is convenient because it is also the update rate of the loop feedback and lock detect filters in this design. It should be apparent that in a GNSS receiver, there may be several different tracks that are active at any time, and this method can be performed similarly for each track. First in step S604, the fast lock detects are calculated and it is determined whether any fast lock can be detected for this track in step S606. If any fast locks are detected, the track and associated measurements from the track are marked as valid for this interval in step S614, and processing returns to step S602. Otherwise if step S606 determines that no fast locks are detected, measurements from this track are marked as invalid in step S608. However, the track is not immediately killed because it may still be useful for some purposes. Next, in step S610 the slow lock detects are calculated and it is determined whether any slow locks can be detected for this track in step S612. More particularly, the slow lock detect associated with the lowest target CNO (e.g. 5 dB-Hz) should be found for the track. If not, the track is killed in step S616. Otherwise, the track is kept in step S614, albeit with invalid measurements.

For the determinations in steps S608, and S610, four fast and four slow lock detect CNOs are defined in example embodiments of block 208 according to the invention as shown in Table 1 below. In this example embodiment, the slow lock detect periods are twice as long as fast lock detects, due to the requirement for lower $P_{fa}$ and higher $P_d$ associated with killing an enhanced sensitivity track.

TABLE 1

| Mode | $P_{fa}, P_d$ | Target CNO (dB-Hz) | Integration Time (secs) | Threshold$_N$ |
|---|---|---|---|---|
| Fast | 0.01, 0.99 | 5 | 30 | 1.073 |
| Fast | 0.01, 0.99 | 7 | 12 | 1.115 |
| Fast | 0.01, 0.99 | 10 | 4 | 1.200 |
| Fast | 0.01, 0.99 | 15 | 1 | 1.420 |
| Slow | 0.001, 0.999 | 5 | 60 | 1.073 |
| Slow | 0.001, 0.999 | 7 | 24 | 1.115 |
| Slow | 0.001, 0.999 | 10 | 8 | 1.200 |
| Slow | 0.001, 0.999 | 15 | 2 | 1.420 |

In embodiments, the lock detections are formed as follows:

$$L_{det\,N} = (\Sigma_{1\ldots N}(SQRT((I_{100msec}(n))^2(Q_{100msec}(n))^2)))/N \times noise_{est\,100msecs}$$

Where N is the number of 100 msec non-coherent integration periods summed into $L_{det\,N}$ for each lock detect to be performed. In the example embodiment with TABLE 1, N=300 for the fast lock detect with a target CNO of 5 dB-Hz, N=120 for the fast lock detect with a target CNO of 7 dB-Hz, etc. $I_{100msec}$, $Q_{100msec}$ are the 100 msec coherent integration values. $noise_{est\,100msecs}$ is the noise channel estimate referred to the 100 msec period. The 100 msec noise channel estimate is related to the 20 msec noise channel estimate as follows:

$$noise_{est\,100\,msec} = SQRT(5) \times noise_{est\,20\,msec}$$

The value of $noise_{est\,20\,msec}$ can be determined from a non-tracking channel, because a non-tracking channel usually uses a non-standard code that does not correlate with the satellite codes. The noise channel may also use frequency hopping across, for example, +1-10 kHz to spread the impact of any individual narrowband interferer on the noise estimate. The noise channel can also be estimated across many code and carrier frequency bin hypotheses such that it is heavily averaged across a period of, for example, 20 msec. This results in the variance of the noise channel being small compared with the signal channels. The noise channel is essentially not very noisy compared to the track channels so it does not add significant uncertainty to the Ldet computation compared to the signal power estimate for a given satellite.

So, for example, in step S606 the fast lock detect values are formed using N=10, 40, 120 and 300 and each result is compared to the corresponding threshold value for that integration period in the last column of TABLE 1 (e.g. Threshold$_{N=10}$=1.420, . . . , respectively). More particularly, after finding the various values of $L_{det\,N}$ using each of the N 100 msec correlations and noise estimate above, whether any lock detect has been detected is determined from TABLE 1 as follows:

if ($L_{det\,N}$ > Threshold$_N$)
   lock detect = true
else
   lock detect = false The present inventors recognize that there is a trade-off between very low CNO lock detect and measurement reliability. For very low CNOs, the lock detection may take from tens of seconds to minutes. Clearly a user may travel a significant distance during these periods such that the use of measurements from very low CNO satellite signals must be treated with caution, even if the tracks are kept. Accordingly, examples of using measurements from very low CNO satellite signals include the following:

1. If the receiver has not been able to previously determine a GPS position (e.g. to within several hundred meters) but knows it is stationary (e.g. via MEMS sensors) then very low CNO measurements (and correspondingly slow lock detects) may be effectively used. For example, averaged position fixes may be able to find an otherwise lost object that has an associated tracking device.

2. If the receiver does not require real-time position updates (e.g. no requirement for position fix delay with respect to truth of approximately 1 second) the measurement may be used in real-time but the position fix may be flagged as low quality until a time delay of approximately the lock detect period has passed. Another version of this technique is to delay the measurements used in a position fix by approximately the lock detect period.

It should be further noted that it is possible to trade-off $P_{fa}$, $P_d$ versus integration time in various alternative embodiments, essentially tuning the probabilities to the required "trust" level of the lock detects. In the example of TABLE 1, for example, the probabilities have been chosen to provide 99% successful measurement usage from the fast lock detect (measurement won't be used if lock detect indicates false), and 0.1% probability of erroneously killing a track based on the slow lock detect. However, the invention is not limited to this set of example probabilities.

To assist in the decision process about what to do with a track that has passed either the slow or fast lock detects, it is useful to also know the strength of the signal. Returning to FIG. 2, and with regard to determining CNO for a given track, for example as performed by block 210 in step S602, the present inventors recognize that one of the challenges of −165 dBm tracking is measuring the CNO with any sort of accuracy. Accordingly, the following describes example techniques for measuring CNO at −165 dBm according to example embodiments of block 210.

In embodiments, block 210 computes the −165 dBm CNO via an SNR measurement, and the SNR measurement uses a filtered version of the prompt signal magnitude. The prompt on-frequency signal magnitude is given as follows:

$$M_{prompt}(n) = SQRT[(I_{100\,msec}(n))^2 + (Q_{100\,msec}(n))^2]$$

Where $I_{100msec}(n)$ and $Q_{100\,msec}(n)$ are I and Q coherent integrations across a 100 msec period. Simulations run by the present inventors with 20 msec coherent integration periods at −165 dBm indicate that the CNO measurement cannot be made accurate enough within any reasonable time period, hence 100 msec coherent integration periods are used. The relationship between SNR and CNO is given as follows:

$$CNO_{est} = SNR_{est} + 10\ dB$$

Where $SNR_{est}$ is the ratio of signal to noise in a 10 Hz bandwidth, and $CNO_{est}$ is the carrier to noise ratio in a 1 Hz bandwidth. A new term $SNR_{ratio}$ is formed as follows:

$$SNR_{ratio}(n) = (512 \times M_{prompt}(n))/noise_{est\,100msecs}$$

Where, $noise_{est\,100msecs}$ is the filtered noise estimate with 100 msec coherent integration. As set forth, previously, the 100 msec noise estimate can be derived from the msecs noise channel estimate as follows:

$$noise_{est\,100\,msec} = SQRT(5) \times noise_{est\,20\,msecs}$$

Where $noise_{est20msec}$ can be determined similarly as described above.

The filtered version of the $SNR_{ratio}$ thus provides the SNR measurement as follows:

$$SNR_{meas}(n+1) = [(1-\alpha_{SNR\,meas}) \times SNR_{meas}(n)] + [\alpha_{SNR\,meas} \times DC_{gain} \times SNR_{ratio}(n)]$$

Where $DC_{gain} = 2^{10} = 1024$, $\alpha_{SNR\,meas} = \frac{1}{2}^K$. ($SNR_{meas}(n+1)$ is the filtered lock detect output. K controls the loop time constant, and therefore the bandwidth of the CNO measurement. The filter is leaky (or progressive) with time varying time constant K. K initially varies between 0 ... 10, with K being updated on the $2^K$th coherent integration period (i.e. PDI), K is updated after the filter is run.

The final K value is altered to vary the CNO measurement pull-in speed based on the fast lock detect estimation of probability that the CNO is greater than a given value. In embodiments, for very low CNOs, e.g. 5 dB-Hz, K is set to 10, providing maximum filtering of the CNO measurement. In these and other embodiments, for moderate CNOs, e.g. >10 dB-Hz, a K value of 8 is used.

In embodiments, block 210 computes the $CNO_{est}$ from the calculated $SNR_{meas}$ value via a lookup table. One example of a lookup table is shown in TABLE 2 below. The lookup table consists of $SNR_{meas\,tabke}$ values determined via Matlab simulation, in which the address offset of the table refers to a corresponding value of $CNO_{est}$. The $CNO_{est}$ varies between 0 and 54.1 dB-Hz in this example.

TABLE 2

| $SNR_{meas}$ table | $SNR_{meas}$ table | $SNR_{meas}$ table | $SNR_{meas}$ table | $SNR_{meas}$ table | $CNO_{est}$ (dB-Hz) |
|---|---|---|---|---|---|
| 537 | 538 | 539 | 539 | 540 | 0.0, 0.1, 0.2, 0.3, 0.4 |
| 540 | 541 | 541 | 542 | 543 | 0.5, 0.6, 0.7, 0.8, 0.9 |
| 544 | 545 | 545 | 546 | 547 | 1.0, 1.1, 1.2, 1.3, 1.4 |

TABLE 2-continued

| $SNR_{meas}$ table | $SNR_{meas}$ table | $SNR_{meas}$ table | $SNR_{meas}$ table | $SNR_{meas}$ table | $CNO_{est}$ (dB-Hz) |
|---|---|---|---|---|---|
| 547 | 548 | 549 | 550 | 551 | 1.5, 1.6, 1.7, 1.8, 1.9 |
| 552 | 552 | 553 | 554 | 555 | 2.0, 2.1, 2.2, 2.3, 2.4 |
| 557 | 557 | 558 | 560 | 560 | 2.5, 2.6, 2.7, 2.8, 2.9 |
| 562 | 563 | 564 | 565 | 567 | 3.0, 3.1, 3.2, 3.3, 3.4 |
| 567 | 569 | 570 | 572 | 573 | 3.5, 3.6, 3.7, 3.8, 3.9 |
| 574 | 576 | 577 | 579 | 580 | 4.0, 4.1, 4.2, 4.3, 4.4 |
| 582 | 583 | 584 | 586 | 588 | 4.5, 4.6, 4.7, 4.8, 4.9 |
| 590 | 592 | 593 | 595 | 597 | 5.0, 5.1, 5.2, 5.3, 5.4 |
| 598 | 601 | 603 | 605 | 607 | 5.5, 5.6, 5.7, 5.8, 5.9 |
| 609 | 611 | 613 | 615 | 618 | 6.0, 6.1, 6.2, 6.3, 6.4 |
| 620 | 623 | 625 | 627 | 630 | 6.5, 6.6, 6.7, 6.8, 6.9 |
| 632 | 636 | 638 | 641 | 644 | 7.0, 7.1, 7.2, 7.3, 7.4 |
| 646 | 650 | 652 | 655 | 658 | 7.5, 7.6, 7.7, 7.8, 7.9 |
| 661 | 665 | 668 | 672 | 675 | 8.0, 8.1, 8.2, 8.3, 8.4 |
| 678 | 682 | 687 | 689 | 693 | 8.5, 8.6, 8.7, 8.8, 8.9 |
| 698 | 701 | 705 | 709 | 713 | 9.0, 9.1, 9.2, 9.3, 9.4 |
| 718 | 722 | 726 | 731 | 736 | 9.5, 9.6, 9.7, 9.8, 9.9 |
| 740 | 745 | 750 | 755 | 760 | 10.0, 10.1, 10.2, 10.3, 10.4 |
| 765 | 771 | 775 | 781 | 786 | 10.5, 10.6, 10.7, 10.8, 10.9 |
| 793 | 798 | 804 | 809 | 815 | 11.0, 11.1, 11.2, 11.3, 11.4 |
| 821 | 828 | 834 | 840 | 847 | 11.5, 11.6, 11.7, 11.8, 11.9 |
| 854 | 860 | 867 | 874 | 881 | 12.0, 12.1, 12.2, 12.3, 12.4 |
| 889 | 896 | 904 | 911 | 919 | 12.5, 12.6, 12.7, 12.8, 12.9 |
| 927 | 935 | 942 | 952 | 959 | 13.0, 13.1, 13.2, 13.3, 13.4 |
| 968 | 976 | 984 | 994 | 1004 | 13.5, 13.6, 13.7, 13.8, 13.9 |
| 1012 | 1022 | 1031 | 1041 | 1050 | 14.0, 14.1, 14.2, 14.3, 14.4 |
| 1060 | 1071 | 1081 | 1090 | 1102 | 14.5, 14.6, 14.7, 14.8, 14.9 |
| 1112 | 1123 | 1133 | 1145 | 1155 | 15.0, 15.1, 15.2, 15.3, 15.4 |
| 1166 | 1178 | 1191 | 1203 | 1215 | 15.5, 15.6, 15.7, 15.8, 15.9 |
| 1227 | 1240 | 1252 | 1265 | 1277 | 16.0, 16.1, 16.2, 16.3, 16.4 |
| 1290 | 1304 | 1317 | 1330 | 1344 | 16.5, 16.6, 16.7, 16.8, 16.9 |
| 1359 | 1373 | 1387 | 1401 | 1416 | 17.0, 17.1, 17.2, 17.3, 17.4 |
| 1431 | 1447 | 1461 | 1477 | 1493 | 17.5, 17.6, 17.7, 17.8, 17.9 |
| 1508 | 1525 | 1541 | 1557 | 1574 | 18.0, 18.1, 18.2, 18.3, 18.4 |
| 1591 | 1608 | 1625 | 1643 | 1661 | 18.5, 18.6, 18.7, 18.8, 18.9 |
| 1678 | 1697 | 1715 | 1734 | 1753 | 19.0, 19.1, 19.2, 19.3, 19.4 |
| 1772 | 1791 | 1810 | 1830 | 1851 | 19.5, 19.6, 19.7, 19.8, 19.9 |
| 1872 | 1892 | 1913 | 1933 | 1956 | 20.0, 20.1, 20.2, 20.3, 20.4 |
| 1976 | 1999 | 2020 | 2043 | 2065 | 20.5, 20.6, 20.7, 20.8, 20.9 |
| 2089 | 2111 | 2136 | 2160 | 2183 | 21.0, 21.1, 21.2, 21.3, 21.4 |
| 2208 | 2233 | 2258 | 2282 | 2308 | 21.5, 21.6, 21.7, 21.8, 21.9 |
| 2334 | 2361 | 2387 | 2413 | 2440 | 22.0, 22.1, 22.2, 22.3, 22.4 |
| 2468 | 2496 | 2523 | 2552 | 2580 | 22.5, 22.6, 22.7, 22.8, 22.9 |
| 2610 | 2639 | 2670 | 2699 | 2730 | 23.0, 23.1, 23.2, 23.3, 23.4 |
| 2761 | 2792 | 2824 | 2856 | 2889 | 23.5, 23.6, 23.7, 23.8, 23.9 |
| 2921 | 2953 | 2988 | 3021 | 3057 | 24.0, 24.1, 24.2, 24.3, 24.4 |
| 3091 | 3126 | 3161 | 3197 | 3235 | 24.5, 24.6, 24.7, 24.8, 24.9 |
| 3271 | 3308 | 3346 | 3384 | 3423 | 25.0, 25.1, 25.2, 25.3, 25.4 |
| 3461 | 3501 | 3541 | 3582 | 3623 | 25.5, 25.6, 25.7, 25.8, 25.9 |
| 3664 | 3705 | 3748 | 3791 | 3835 | 26.0, 26.1, 26.2, 26.3, 26.4 |
| 3878 | 3922 | 3967 | 4012 | 4059 | 26.5, 26.6, 26.7, 26.8, 26.9 |
| 4106 | 4153 | 4201 | 4249 | 4297 | 27.0, 27.1, 27.2, 27.3, 27.4 |
| 4348 | 4397 | 4447 | 4498 | 4551 | 27.5, 27.6, 27.7, 27.8, 27.9 |
| 4602 | 4654 | 4708 | 4763 | 4817 | 28.0, 28.1, 28.2, 28.3, 28.4 |
| 4872 | 4929 | 4985 | 5042 | 5100 | 28.5, 28.6, 28.7, 28.8, 28.9 |
| 5159 | 5219 | 5279 | 5340 | 5401 | 29.0, 29.1, 29.2, 29.3, 29.4 |
| 5463 | 5526 | 5590 | 5654 | 5718 | 29.5, 29.6, 29.7, 29.8, 29.9 |
| 5785 | 5852 | 5920 | 5988 | 6056 | 30.0, 30.1, 30.2, 30.3, 30.4 |
| 6127 | 6197 | 6268 | 6340 | 6414 | 30.5, 30.6, 30.7, 30.8, 30.9 |
| 6487 | 6563 | 6638 | 6715 | 6792 | 31.0, 31.1, 31.2, 31.3, 31.4 |
| 6870 | 6950 | 7030 | 7110 | 7193 | 31.5, 31.6, 31.7, 31.8, 31.9 |
| 7276 | 7360 | 7445 | 7531 | 7618 | 32.0, 32.1, 32.2, 32.3, 32.4 |
| 7706 | 7795 | 7885 | 7977 | 8068 | 32.5, 32.6, 32.7, 32.8, 32.9 |
| 8161 | 8256 | 8351 | 8447 | 8545 | 33.0, 33.1, 33.2, 33.3, 33.4 |
| 8643 | 8744 | 8845 | 8947 | 9051 | 33.5, 33.6, 33.7, 33.8, 33.9 |
| 9155 | 9260 | 9368 | 9476 | 9586 | 34.0, 34.1, 34.2, 34.3, 34.4 |
| 9696 | 9808 | 9921 | 10037 | 10152 | 34.5, 34.6, 34.7, 34.8, 34.9 |
| 10270 | 10388 | 10508 | 10630 | 10753 | 35.0, 35.1, 35.2, 35.3, 35.4 |
| 10878 | 11004 | 11130 | 11259 | 11390 | 35.5, 35.6, 35.7, 35.8, 35.9 |
| 11520 | 11654 | 11789 | 11925 | 12064 | 36.0, 36.1, 36.2, 36.3, 36.4 |
| 12202 | 12344 | 12487 | 12631 | 12778 | 36.5, 36.6, 36.7, 36.8, 36.9 |
| 12925 | 13074 | 13226 | 13380 | 13534 | 37.0, 37.1, 37.2, 37.3, 37.4 |
| 13691 | 13848 | 14009 | 14170 | 14335 | 37.5, 37.6, 37.7, 37.8, 37.9 |
| 14500 | 14668 | 14838 | 15010 | 15183 | 38.0, 38.1, 38.2, 38.3, 38.4 |
| 15359 | 15537 | 15717 | 15899 | 16083 | 38.5, 38.6, 38.7, 38.8, 38.9 |
| 16269 | 16457 | 16647 | 16840 | 17035 | 39.0, 39.1, 39.2, 39.3, 39.4 |
| 17232 | 17431 | 17633 | 17837 | 18044 | 39.5, 39.6, 39.7, 39.8, 39.9 |

TABLE 2-continued

| SNR$_{meas}$ table | SNR$_{meas}$ table | SNR$_{meas}$ table | SNR$_{meas}$ table | SNR$_{meas}$ table | CNO$_{est}$ (dB-Hz) |
|---|---|---|---|---|---|
| 18252 | 18464 | 18677 | 18893 | 19113 | 40.0, 40.1, 40.2, 40.3, 40.4 |
| 19334 | 19557 | 19784 | 20013 | 20244 | 40.5, 40.6, 40.7, 40.8, 40.9 |
| 20478 | 20715 | 20956 | 21198 | 21443 | 41.0, 41.1, 41.2, 41.3, 41.4 |
| 21691 | 21942 | 22197 | 22454 | 22714 | 41.5, 41.6, 41.7, 41.8, 41.9 |
| 22976 | 23242 | 23511 | 23783 | 24059 | 42.0, 42.1, 42.2, 42.3, 42.4 |
| 24338 | 24619 | 24903 | 25192 | 25484 | 42.5, 42.6, 42.7, 42.8, 42.9 |
| 25779 | 26077 | 26380 | 26685 | 26993 | 43.0, 43.1, 43.2, 43.3, 43.4 |
| 27306 | 27622 | 27942 | 28266 | 28593 | 43.5, 43.6, 43.7, 43.8, 43.9 |
| 28923 | 29258 | 29597 | 29940 | 30286 | 44.0, 44.1, 44.2, 44.3, 44.4 |
| 30637 | 30992 | 31351 | 31713 | 32080 | 44.5, 44.6, 44.7, 44.8, 44.9 |
| 32452 | 32828 | 33208 | 33593 | 33982 | 45.0, 45.1, 45.2, 45.3, 45.4 |
| 34374 | 34773 | 35175 | 35583 | 35995 | 45.5, 45.6, 45.7, 45.8, 45.9 |
| 36412 | 36833 | 37259 | 37691 | 38128 | 46.0, 46.1, 46.2, 46.3, 46.4 |
| 38568 | 39016 | 39467 | 39923 | 40387 | 46.5, 46.6, 46.7, 46.8, 46.9 |
| 40853 | 41326 | 41805 | 42289 | 42779 | 47.0, 47.1, 47.2, 47.3, 47.4 |
| 43274 | 43775 | 44282 | 44794 | 45314 | 47.5, 47.6, 47.7, 47.8, 47.9 |
| 45838 | 46369 | 46906 | 47449 | 47998 | 48.0, 48.1, 48.2, 48.3, 48.4 |
| 48554 | 49117 | 49685 | 50260 | 50842 | 48.5, 48.6, 48.7, 48.8, 48.9 |
| 51431 | 52027 | 52629 | 53238 | 53854 | 49.0, 49.1, 49.2, 49.3, 49.4 |
| 54478 | 55109 | 55748 | 56393 | 57045 | 49.5, 49.6, 49.7, 49.8, 49.9 |
| 57706 | 58374 | 59049 | 59734 | 60425 | 50.0, 50.1, 50.2, 50.3, 50.4 |
| 61125 | 61833 | 62549 | 63274 | 64006 | 50.5, 50.6, 50.7, 50.8, 50.9 |
| 64747 | 65497 | 66255 | 67022 | 67798 | 51.0, 51.1, 51.2, 51.3, 51.4 |
| 68583 | 69377 | 70181 | 70993 | 71816 | 51.5, 51.6, 51.7, 51.8, 51.9 |
| 72648 | 73488 | 74339 | 75200 | 76070 | 52.0, 52.1, 52.2, 52.3, 52.4 |
| 76951 | 77842 | 78744 | 79655 | 80578 | 52.5, 52.6, 52.7, 52.8, 52.9 |
| 81511 | 82455 | 83409 | 84375 | 85352 | 53.0, 53.1, 53.2, 53.3, 53.4 |
| 86340 | 87340 | 88351 | 89375 | 90410 | 53.5, 53.6, 53.7, 53.8, 53.9 |
| 91457 | 92516 | | | | 54.0, 54.1, 54.2, 54.3, 54.4 |

In embodiments, the CNO$_{est}$ lookup involves a binary search of the above table as follows:

```
min = 0
max = 542
while (max != min)
    mid = (max + min) / 2
    if ( SNR$_{meas}$ (n+1) < SNR$_{meas\ table}$ (mid))
        max = mid – 1
    else
        min = mid
    end || if statement
end || while statement
```

At the end of this process, the appropriate SNR$_{meas\ table}$ entry in the table has been identified (i.e. SNR$_{meas\ table}$ (max=min)), and the corresponding value in the CNO$_{est}$ column is obtained. (Note that for ease of illustration, the table above has been constructed with five SNR entries in separate columns per row, with five corresponding CNO values in the CNO$_{est}$ column).

The present inventors have estimated the expected accuracy of the CNO measurement for several different K values, assuming the filter has reached steady state. For 5 dB-Hz and K=10 the approximate accuracy of the CNO has a standard deviation of about 0.4 dB. For 10 dB-Hz and K=8 the accuracy of the CNO is also approximately 0.4 dB.

The present inventors have also estimated the pull-in performance of the CNO measurement for 5 dB-Hz, K=10 and 10 dB-Hz, K=8 respectively, with an initial SNR$_{meas}$=0 in both cases. Note that in practice the initial SNR$_{meas}$ may be set to the expected value (derived via lock detect estimate) and K can be initialized to something other than 0 (for smoother CNO measurement pull-in). At 5 dB-Hz the CNO settling time is on the order of about 60 seconds, whereas at 10 dB-Hz the settling time is around 10 seconds.

As mentioned above, the CNO measurement's effective bandwidth is adjusted via the fast lock detects. This mechanism is provided to speed up the CNO response for stronger CNOs. In one example embodiment, the CNO bandwidth is adjusted via the K value as follows:

```
if (L$_{detN=10}$ = true )
    K = 8
else
    if ( L$_{detN=40}$ = true )
        K = 9
    else
        K = 10
    end // if statement
end // if statement
```

As set forth above, according to certain aspects, embodiments of the present invention provide a tracker architecture that includes multiple tracking loops per channel. This architecture allows, for example, for primary tracking loops that do not use data bit stripping and secondary tracking loops that use data bit stripping for enhanced sensitivity. This further allows, for example, loops having different coherent integration periods. Still further, this architecture allows, for example, improved tracking performance by cross-track aiding techniques.

In the following examples, a primary tracking loop uses a fixed wide bandwidth, while the secondary tracking loop uses a variable, and likely narrower, bandwidth (i.e. for enhanced sensitivity tracking according to embodiments of the invention). This is not necessary in all embodiments of the invention. Moreover, it may be possible to have more than two loops per channel, for example a third loop using a very narrow bandwidth. Those skilled in the art will appreciate the various alternative embodiments after being taught by the following examples.

In embodiments, there are four configurations of the primary/secondary tracking loops per channel as follows:

Primary and secondary track channels each use hardware tracking loops (e.g. hardware correlators, matched filters, integrators implemented by an ASIC, etc.). This is the hardware intensive option.

The primary track channel uses hardware tracking loops and the secondary track channel uses software based (e.g. firmware running on a CPU or DSP) carrier rotation and code phase interpolation to perform tracking from the hardware correlations (i.e. software intensive option).

Primary hardware track channel only. This mode eliminates the secondary track channel and hence the enhanced sensitivity track capability, and so this option is not described in further detail.

Secondary hardware track channel only. This mode eliminates the primary track channel, using the secondary track channel as the primary with data bit stripping and enhanced sensitivity enabled.

Figure 3:
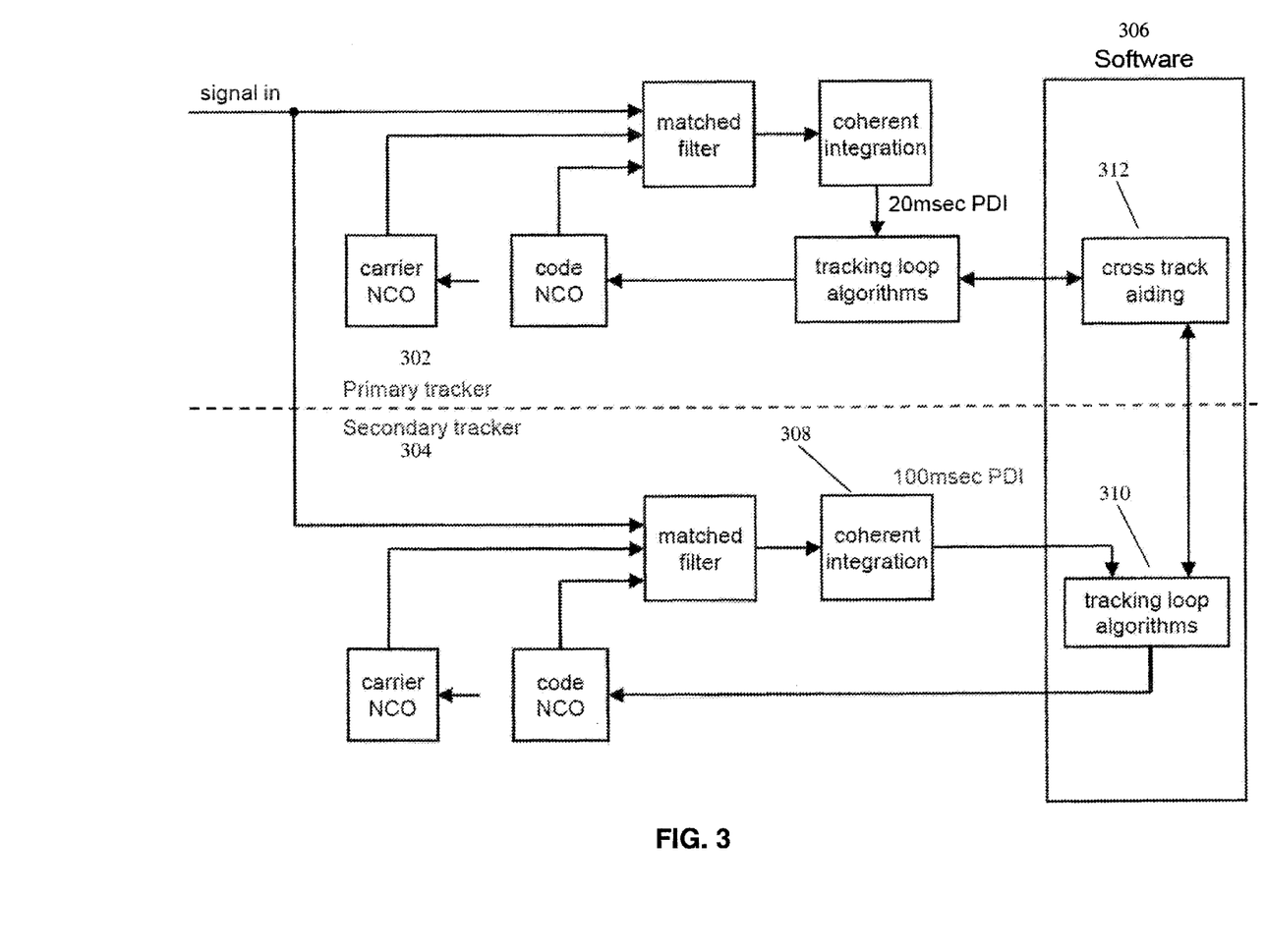
FIG. 3 is a block diagram illustrating one example configuration of a multiple loop per channel tracking architecture according to aspects of the invention.

In embodiments with approximately 60 track channels implemented by hardware, one preferred implementation is the hardware intensive option. FIG. 3 shows an example block diagram of the hardware intensive option, with primary tracker 302, secondary tracker 304 and cross-track software 306. In this example, primary tracker 302 uses a conventional fixed-bandwidth tracking loop and 20 msec correlation values, unlike the variable-bandwidth tracking loops described in the co-pending application.

Meanwhile, secondary tracker 304 preferably uses a variable-bandwidth tracking loop as described in the co-pending application, including using 100 msec correlation values from coherent integration block 308, which is implemented in hardware. In this example, the 100 msec correlation values are passed to software block 306. Software block 306 includes secondary channel track algorithms 310 (e.g. code phase and AFC track, multi-level lock detect, CNO measurement, etc.), as described above and in the co-pending application, and the code phase and AFC frequency feedback is closed via the secondary hardware channel code and carrier NCOs.

As further shown in FIG. 3, software block 306 includes cross track aiding algorithm 312. This component is provided to initiate secondary tracking loop parameters from primary tracking loop parameters and vice-versa. For example, cross track aiding algorithm 312 receives operating parameters from primary loop 302 and secondary loop 304 and performs calculations including: Code phase, code phase rate, carrier frequency, carrier frequency phase, and carrier frequency rate. Those skilled in the art will appreciate various ways these calculations can be performed from operating values in the code phase and carrier tracking loops. Moreover, those skilled in the art will appreciate various ways that code and carrier tracking loops can be initialized using these calculated values.

In embodiments, cross track aiding can be applied to initialize either a primary or secondary track, assuming that the other track type is currently tracking. Typical aiding examples include:

Primary track CNO is high (e.g. 20 dB-Hz) and initializes secondary track.

Secondary track has lost lock (e.g. due to dynamics) and is re-initialized via primary track.

Primary track has lost lock (e.g. due to low CNO) and is re-initialized via secondary track when the CNO rises again.

Figure 4:
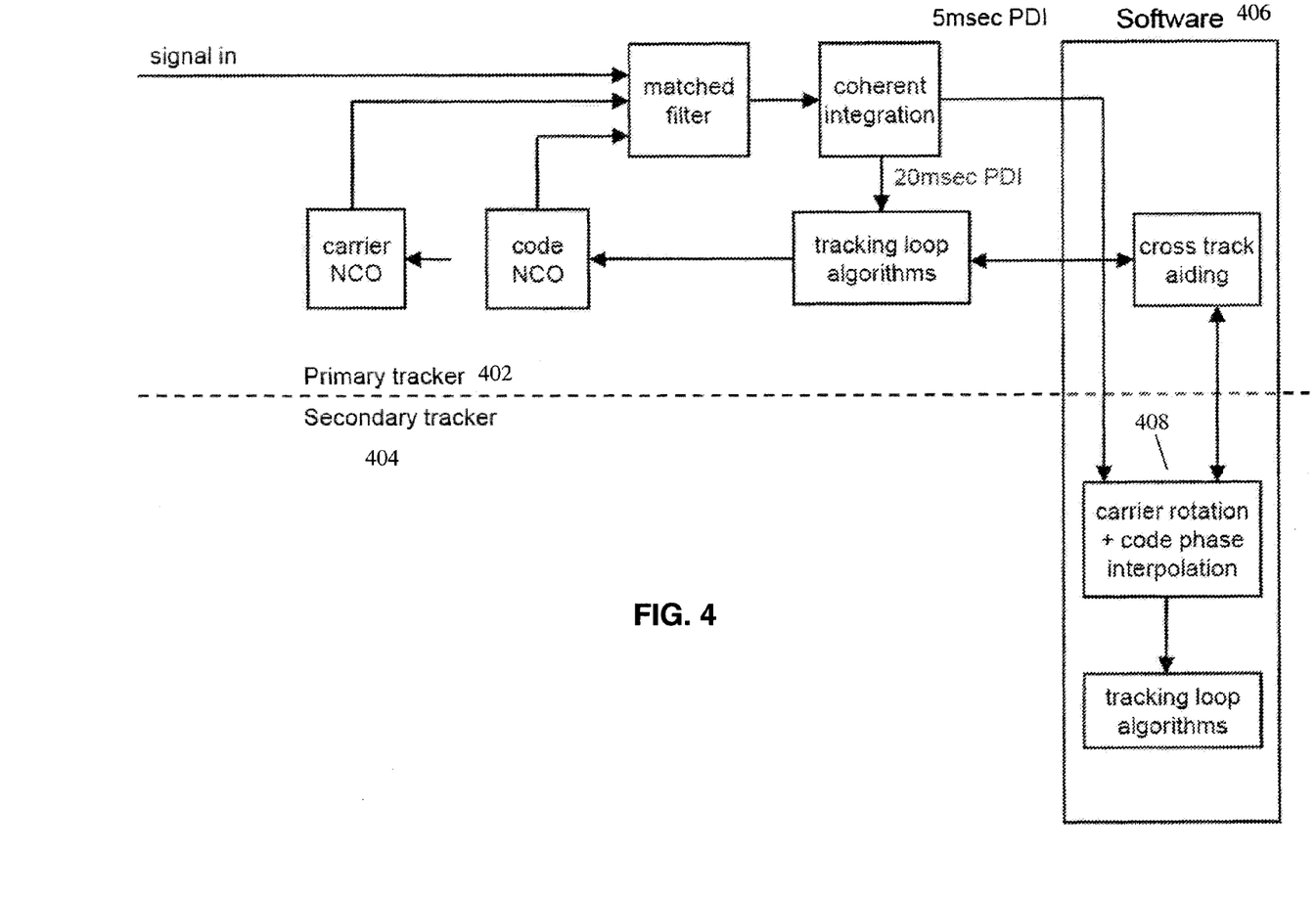
FIG. 4 is a block diagram illustrating another example configuration of a multiple loop per channel tracking architecture according to aspects of the invention.

FIG. 4 shows an example implementation of the dual tracker software intensive mode, with primary tracker 402, secondary tracker 404 and software block 406. In this configuration the secondary track channel 404 is entirely implemented in software block 406. Software code and carrier block 408 forms the secondary channel 100 msec correlations by software manipulation of 5 msec correlations from the primary hardware channel 402. This manipulation includes interpolation of code phase (e.g. at a 10 Hz rate) to generate secondary track correlations via the primary track correlations, and carrier frequency rotation in software (e.g. at a 200 Hz rate) to generate secondary track carrier frequency offsets from primary carrier frequency offsets. These techniques are dependent on the difference in code phase and carrier frequency between primary and secondary channels remaining within certain boundaries. This is the reason 5 msec correlations are used in one preferred example. Those skilled in the art will appreciate that there are various known techniques by which code phase interpolation and carrier frequency rotation can be performed to form the 100 msec correlations from 5 msec correlation values, and so further details thereof will be omitted here for clarity of the invention.

Figure 5:
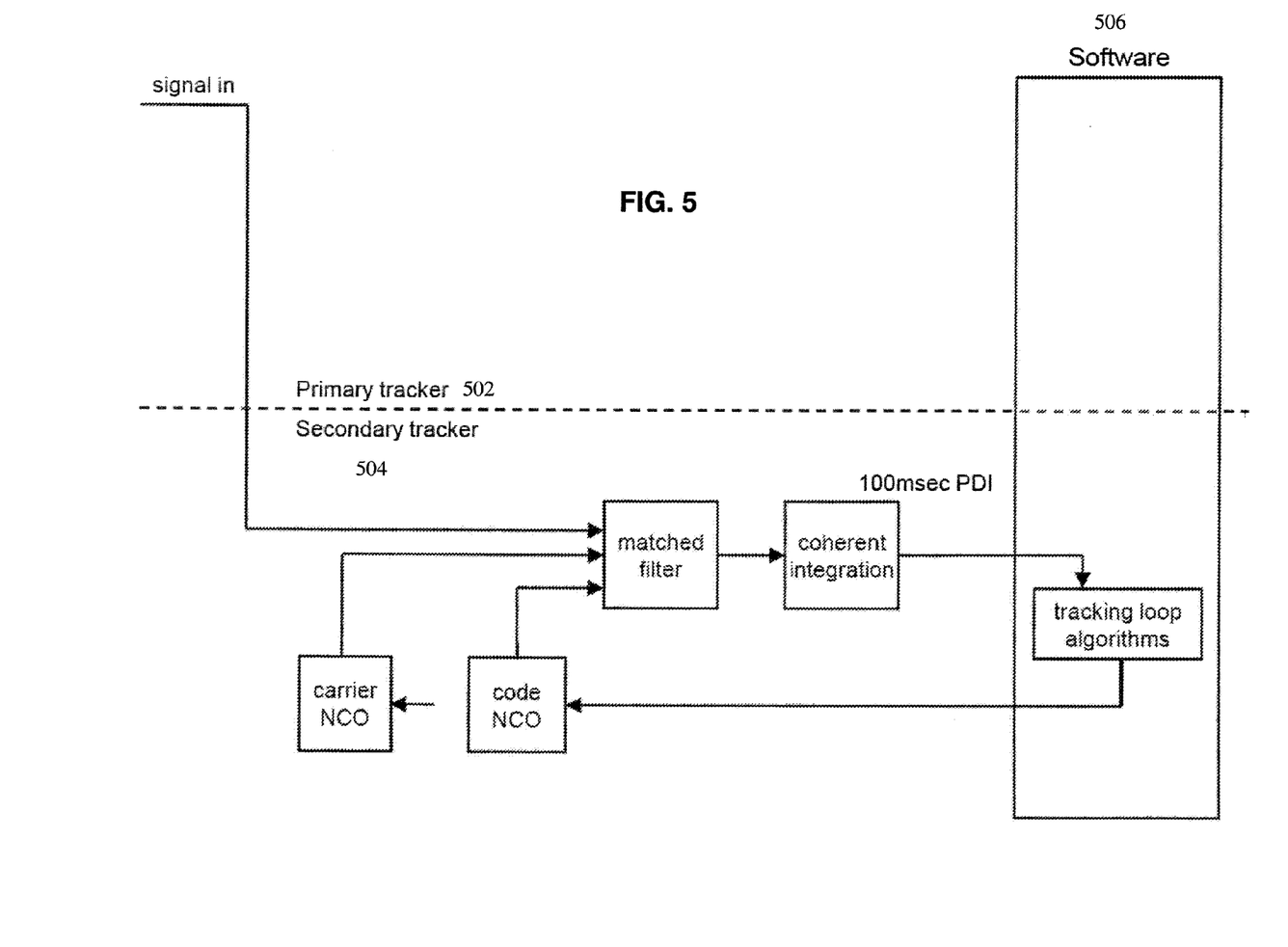
FIG. 5 is a block diagram illustrating another example configuration of a multiple loop per channel tracking architecture according to aspects of the invention.

FIG. 5 shows an example implementation of the secondary track channel only configuration according to embodiments of the invention. As shown, this embodiment is similar to the hardware intensive option, but with the primary tracking loop removed, and no cross-track aiding functionality. The secondary tracker 504 can thus be implemented in similar fashion as secondary tracker 304 described above. Likewise, secondary track algorithms can be implemented in software as described in that example.

In embodiments including those described above, the secondary track channel preferably uses data bit stripping, for example using data bit prediction such as that described in U.S. Pat. No. 7,924,220, the contents of which are incorporated herein by reference. Such functionality would be included in secondary track algorithms 310, for example. Further aspects of these embodiments are described in more detail in co-pending application Ser. No. 13/341,851, including the ability to perform unknown data bit "free-wheeling."

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A GNSS tracker apparatus comprising:
   a fast lock detection that calculates a plurality of fast lock detect values for a corresponding plurality of first signal levels;
   a slow lock detection that calculates a plurality of slow lock detect values for the corresponding plurality of second signal levels; and
   a threshold detector that compares the calculated fast and slow lock values to associated thresholds.

2. The apparatus of claim 1, wherein the first and second signal levels are the same.

3. The apparatus of claim 1, wherein the calculated fast lock detect values are used to determine whether measurements from a track are valid.

4. The apparatus of claim 1, wherein the calculated slow lock detect values are used to determine whether to kill a track.

5. The apparatus of claim 4, wherein the calculated slow lock detect values are used to determine whether to kill the track only if none of the calculated fast lock detect values for the track exceed their associated thresholds.

6. The apparatus of claim 1, wherein the calculated fast and slow lock detect values are together used to determine whether to keep a track even if measurements from the track are not valid.

7. A GNSS tracker apparatus, comprising:
   a fast lock detection that calculates a plurality of fast lock detect values for a corresponding plurality of first signal levels;
   a slow lock detection that calculates a plurality of slow lock detect values for a corresponding plurality of second signal levels;
   a threshold detector that compares the calculated fast and slow lock values to associated thresholds; and
   a signal strength estimator that provides a strength measurement for a signal being tracked based on a filtered version of a prompt signal magnitude.

8. The apparatus of claim 7, further comprising a lookup table that associates a plurality of signal strength measurements with estimated signal strength.

9. A GNSS tracking method comprising:
   calculating a plurality of fast lock detect values for a corresponding plurality of first signal levels;
   calculating a plurality of slow lock detect values for the corresponding plurality of second signal levels; and
   comparing the calculated fast and slow lock values to associated thresholds.

10. The method of claim 9, wherein the first and second signal levels are the same.

11. The method of claim 9, further comprising:
    determining whether measurements from a track are valid using the calculated fast lock detect values.

12. The method of claim 9, further comprising:
determining whether to kill a track using the calculated slow lock detect values.

13. A GNSS tracking method comprising:
calculating a plurality of fast lock detect values for a corresponding plurality of first signal levels;
calculating a plurality of slow lock detect values for a corresponding plurality of second signal levels;
comparing the calculated fast and slow lock values to associated thresholds; and
determining whether to kill a track using the calculated slow lock detect values,
wherein the step of determining whether to kill the track is performed only if none of the calculated fast lock detect values for the track exceed their associated thresholds.

14. The method of claim 9, further comprising:
determining whether to keep a track even if measurements from the track are not valid using both the calculated fast and slow lock detect values.

15. The method of claim 9, further comprising:
calculating a strength measurement for a signal being tracked based on a filtered version of a prompt signal magnitude.

16. The method of claim 15, further comprising:
determining an estimated signal strength value by using a lookup table that associates a plurality of signal strength measurements with estimated signal strength.

17. The apparatus of claim 1, wherein the plurality of first and second signal levels are different target signal to noise ratios respectively associated with different numbers of integration periods of a signal for which the plurality of fast and slow lock detect values are calculated.

18. The apparatus of claim 1, wherein the plurality of fast and slow lock detect values are all calculated using respective numbers of integration periods of the same signal.

19. The apparatus of claim 18, wherein the integration periods are 100 msec non-coherent integration periods, and wherein the plurality of fast and slow lock detect values are calculated using in-phase and quadrature signal values over the 100 msec non-coherent integration periods.

20. The apparatus of claim 1, wherein the associated thresholds for the calculated fast lock values are all associated with a first probability of detection, and wherein the associated thresholds for the calculated slow lock values are all associated with a second probability of detection, and wherein the second probability of detection is higher than the first probability of detection.

* * * * *